United States Patent
Lin et al.

(10) Patent No.: US 9,938,146 B2
(45) Date of Patent: Apr. 10, 2018

(54) HIGH ASPECT RATIO CATALYTIC REACTOR AND CATALYST INSERTS THEREFOR

(71) Applicants: Jiefeng Lin, Rochester, NY (US); Sean M. Kelly, Pittsford, NY (US)

(72) Inventors: Jiefeng Lin, Rochester, NY (US); Sean M. Kelly, Pittsford, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 101 days.

(21) Appl. No.: 14/979,790

(22) Filed: Dec. 28, 2015

(65) Prior Publication Data
US 2017/0183228 A1    Jun. 29, 2017

(51) Int. Cl.
*B01J 19/24*    (2006.01)
*B01J 23/88*    (2006.01)
(Continued)

(52) U.S. Cl.
CPC .............. *C01B 3/40* (2013.01); *B01J 19/249* (2013.01); *B01J 19/2415* (2013.01);
(Continued)

(58) Field of Classification Search
CPC ....................................................... B01J 23/894
See application file for complete search history.

(56) References Cited

U.S. PATENT DOCUMENTS

| 2,593,507 A | 4/1952 | Wainer |
| 2,692,760 A | 10/1954 | Flurschutz |

(Continued)

FOREIGN PATENT DOCUMENTS

| DE | 3515681 | * 11/1986 |
| DE | 10330859 A1 | 2/2004 |

(Continued)

OTHER PUBLICATIONS

JP 10-000365 Transllation, Jan. 1998.*

(Continued)

*Primary Examiner* — Colin W. Slifka
(74) *Attorney, Agent, or Firm* — Ralph J. Mancini

(57) ABSTRACT

The present invention relates to high efficient tubular catalytic steam reforming reactor configured from about 0.2 inch to about 2 inch inside diameter high temperature metal alloy tube or pipe and loaded with a plurality of rolled catalyst inserts comprising metallic monoliths. The catalyst insert substrate is formed from a single metal foil without a central supporting structure in the form of a spiral monolith. The single metal foil is treated to have 3-dimensional surface features that provide mechanical support and establish open gas channels between each of the rolled layers. This unique geometry accelerates gas mixing and heat transfer and provides a high catalytic active surface area. The small diameter, high aspect ratio tubular catalytic steam reforming reactors loaded with rolled catalyst inserts can be arranged in a multi-pass non-vertical parallel configuration thermally coupled with a heat source to carry out steam reforming of hydrocarbon-containing feeds. The rolled catalyst inserts are self-supported on the reactor wall and enable efficient heat transfer from the reactor wall to the reactor interior, and lower pressure drop than known particulate catalysts. The heat source can be oxygen transport membrane reactors.

9 Claims, 6 Drawing Sheets

(51) Int. Cl.
*B01J 35/02* (2006.01)
*B01J 35/04* (2006.01)
*C01B 3/40* (2006.01)
*B01J 23/89* (2006.01)
B01J 19/32 (2006.01)
C01B 3/38 (2006.01)

(52) U.S. Cl.
CPC ........... *B01J 23/894* (2013.01); *B01J 35/023* (2013.01); *B01J 35/04* (2013.01); B01J 19/32 (2013.01); B01J 2219/24 (2013.01); B01J 2219/2454 (2013.01); B01J 2219/2479 (2013.01); B01J 2219/30292 (2013.01); B01J 2219/32248 (2013.01); C01B 3/384 (2013.01); C01B 2203/0233 (2013.01); C01B 2203/0805 (2013.01); C01B 2203/1023 (2013.01); C01B 2203/1058 (2013.01); C01B 2203/1064 (2013.01); C01B 2203/1241 (2013.01)

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,468,647 A | 9/1969 | Buyers et al. |
| 3,770,621 A | 11/1973 | Collins et al. |
| 3,861,723 A | 1/1975 | Kunz et al. |
| 3,868,817 A | 3/1975 | Marion et al. |
| 3,891,575 A * | 6/1975 | Brautigam ............ B01D 53/34 422/180 |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retallick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retallick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retallick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,302,355 A * | 4/1994 | Fujikura ............ B01D 53/944 29/890 |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,432,705 A | 7/1995 | Severt et al. |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson |
| 6,214,066 B1 | 4/2001 | Nataraj et al. |
| 6,214,314 B1 | 4/2001 | Nataraj et al. |
| 6,268,075 B1 | 7/2001 | Autenrieth et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |

(56) References Cited

U.S. PATENT DOCUMENTS

| | | |
|---|---|---|
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Kelly et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0135324 A1 | 7/2004 | Brule et al. |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0019827 A1 | 1/2006 | Whittenberger |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0063659 A1 | 3/2006 | Xue et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0245897 A1 | 10/2007 | Besecker et al. |
| 2007/0029342 A1 | 12/2007 | Cross et al. |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0142148 A1 | 6/2008 | Nielsen et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0018394 A1 | 1/2010 | Ekiner et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0203238 A1 | 8/2010 | Magno et al. |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0141672 A1 | 6/2011 | Farley et al. |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0067210 A1 | 3/2012 | Sane et al. |
| 2012/0288439 A1 | 11/2012 | Sundaram et al. |
| 2012/0294783 A1 | 11/2012 | Palamara et al. |
| 2013/0009100 A1 | 1/2013 | Kelly et al. |
| 2013/0009102 A1 | 1/2013 | Kelly et al. |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2013/0258000 A1 | 10/2013 | Ohashi et al. |
| 2014/0044604 A1 | 2/2014 | Lane et al. |
| 2014/0056774 A1 | 2/2014 | Kelly et al. |
| 2014/0060643 A1 | 3/2014 | Martin et al. |

(56) References Cited

U.S. PATENT DOCUMENTS

| | | | |
|---|---|---|---|
| 2014/0183866 A1 | 7/2014 | Kromer et al. | |
| 2014/0206779 A1 | 7/2014 | Lackner | |
| 2014/0231351 A1 | 8/2014 | Wickramasinghe et al. | |
| 2014/0242406 A1* | 8/2014 | Kimura | B01D 53/945 428/592 |
| 2014/0319424 A1 | 10/2014 | Chakravarti et al. | |
| 2014/0319427 A1 | 10/2014 | Chakravarti et al. | |
| 2014/0323597 A1 | 10/2014 | Stuckert et al. | |
| 2014/0323598 A1 | 10/2014 | Chakravarti et al. | |
| 2014/0323599 A1 | 10/2014 | Chakravarti et al. | |
| 2015/0096506 A1 | 4/2015 | Kelly et al. | |
| 2015/0098872 A1 | 4/2015 | Kelly et al. | |
| 2015/0226118 A1 | 8/2015 | Kelly et al. | |
| 2016/0001221 A1 | 1/2016 | Lu et al. | |
| 2016/0118188 A1 | 4/2016 | Wada | |
| 2016/0155570 A1 | 6/2016 | Shimada et al. | |

FOREIGN PATENT DOCUMENTS

| | | | |
|---|---|---|---|
| DE | 102004038435 A1 | 2/2006 | |
| EP | 0 663 231 A2 | 7/1995 | |
| EP | 0926096 A1 | 6/1999 | |
| EP | 0984500 A2 | 3/2000 | |
| EP | 0989093 A2 | 3/2000 | |
| EP | 1504811 A1 | 2/2005 | |
| EP | 1717420 A1 | 11/2006 | |
| EP | 1743694 A1 | 1/2007 | |
| EP | 2 098 491 A1 | 9/2009 | |
| EP | 2873451 A1 | 5/2015 | |
| GB | 688657 | 3/1953 | |
| GB | 689522 | 4/1953 | |
| GB | 697377 | 9/1953 | |
| GB | 713553 | 11/1954 | |
| GB | 1199483 | 7/1970 | |
| GB | 1 312 700 | 4/1973 | |
| GB | 1348375 | 3/1974 | |
| GB | 2079174 | * 1/1982 | |
| JP | 56-136605 | 10/1981 | |
| JP | 3-60739 | * 3/1991 | |
| JP | 6-277526 | * 10/1994 | |
| JP | 10-365 | * 1/1998 | |
| WO | WO 97/41060 | 11/1997 | |
| WO | WO 2011/020192 A1 | 11/1997 | |
| WO | WO 9842636 | 10/1998 | |
| WO | WO 0017418 | 3/2000 | |
| WO | WO 0109059 A1 | 2/2001 | |
| WO | WO 2004/063110 A2 | 7/2004 | |
| WO | WO 2006/064160 A1 | 6/2006 | |
| WO | WO 2007060141 | 5/2007 | |
| WO | WO 2007/092844 A2 | 8/2007 | |
| WO | WO 2007086949 | 8/2007 | |
| WO | WO 2008024405 | 2/2008 | |
| WO | WO 2009/027099 A1 | 3/2009 | |
| WO | WO 2010052641 A2 | 5/2010 | |
| WO | WO 2011083333 A1 | 7/2011 | |
| WO | WO 2011121095 A2 | 10/2011 | |
| WO | WO 2012118730 | 9/2012 | |
| WO | WO 2013009560 A1 | 1/2013 | |
| WO | WO 2013062413 A1 | 5/2013 | |
| WO | WO 2013089895 A1 | 6/2013 | |
| WO | WO 2014/049119 A1 | 4/2014 | |
| WO | WO 2014074559 A1 | 5/2014 | |
| WO | WO 2014077531 A1 | 5/2014 | |
| WO | WO 2014107707 A2 | 7/2014 | |
| WO | WO 2014/160948 A1 | 10/2014 | |
| WO | WO 2014176022 A1 | 10/2014 | |

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

Lee Rosen et al., "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

U.S. Department of Energy—Office of Fossil energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, D.C. pp. 1-10.

Friedmann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

Zhimin Zhong, "Stoichiometric lanthanum chromite based ceramic interconnects with low sintering temperature", Solid State oflonics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2, Energy Conyers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

Andrea Montebelli et al., "Methods for the catalytic activation of metallic structured substrates", Catalysis Science & Technology, 2014, pp. 2846-2870.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Jian-jun Liu, Tong Liu, Wen-dong Wang, Jian-feng Gao, Chu-sheng Chen; Zr0.84Y0.16O1.92-La0.8Sr0.2Cr0.5Fe0.5O3-δ dual-phase composite hollow fiber membrane targeting chemical reactor applications; Journal of Membrane Science 389 (2012) 435-440.

M. Solvang, K.A. Nielsen, and P.H. Larsen, "Optimization of Glass Ceramic Sealant for Intermediate Temperature Solid Oxide Fuel

(56) References Cited

OTHER PUBLICATIONS

Cells", Jan. 1, 2005, XP055352985, Retrieved from the Internet: URL:http://ma.ecsdl.org/content/MA2005-01/30/1206.full.pdf on Mar. 8, 2017.
VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.

* cited by examiner

HIGH ASPECT RATIO CATALYTIC REACTOR AND CATALYST INSERTS THEREFOR

U.S. GOVERNMENT RIGHTS

The invention disclosed and claimed herein was made with United States Government support under Cooperative Agreement number DE-FC26-07NT43088 awarded by the U.S. Department of Energy. The United States Government has certain rights in this invention.

FIELD OF THE INVENTION

The present invention relates to catalytic reactors and catalyst inserts for production of industrial chemicals and intermediates. More particularly, the present invention relates to high efficient tubular catalytic steam reforming reactor with aspect ratio from 50 to 1,000 and tube inside diameter (ID) of from about 0.2 inch to about 2 inches loaded with a plurality of rolled catalyst inserts. The catalyst inserts comprise metallic monoliths having three dimensional surface features that provide mechanical support and establish open gas channels between each of the rolled layers. This unique geometry accelerates gas mixing and heat transfer and provides high catalytic active surface area. The small diameter, high aspect ratio tubular catalytic steam reforming reactors loaded with rolled catalyst inserts can be positioned in a multi-pass non-vertical parallel configuration thermally coupled with a heat source such as oxygen transport membrane reactors.

BACKGROUND

Catalytic steam reforming technology has been widely applied for synthesis gas production from hydrocarbon containing feedstock such as natural gas. Conventional steam methane reformers (SMR) employ tubular reactors packed with reforming catalysts in the form of pellets or structured catalyst packing. The tubular reactors are vertically mounted in parallel arrangement in a furnace. Since the steam reforming process is highly endothermic, external heating sources are required. Burners installed within the furnace housing combust natural gas or some other fuel to support endothermic reactions within catalyst filled tubes. Heat released from combustion reactions is transferred by radiation and convection to tubular reactor outer wall, then by conduction from the outer wall to the inner wall, and then by conduction and convection to the reaction mixture in the tubular reactor interior. A portion of the heat absorbed by the tubular reactor is utilized to bring natural gas and steam feeds from their feed temperature in a range of about 500° C. to about 550° C. to reaction temperature in a range of from about 650° C. to about 950° C. to achieve desired hydrocarbon conversion. Improving heat flux from tubular reactor outer environment to inner environment is a critical step to increase reactor efficiency.

Typical reforming catalysts in particulate form contain nickel as the active metal and alumina as the support material. The catalyst particles can be in the form of ring, cylindrical pellet, or of spherical shape. The catalytic endothermic reforming reactions occur on the catalyst particle exterior surface, as well as within the pores accessible to the reactants. The heat absorbed by the tubular reactor, conducts through the tube wall into the interior to support endothermic reactions. Both convective and conductive heat transfer mechanisms are in play inside the reactor tube. The lower thermal conductivity of catalyst particles affects heat available for endothermic reactions in the reactor interior. The upper limits on gas velocity to minimize pressure drop and/or prevent catalyst particle fluidization affect the heat transfer rate from the tube wall to the catalyst particles, on whose surface the endothermic catalytic reactions occur and where heat is needed. The tube wall temperature typically ranges from about 850° C. to about 1095° C. Such higher temperatures cause considerable expansion of tubes. Since the catalyst particles have a lower coefficient of thermal expansion, the potential exists for considerable slumping of the catalyst particles upon reactor heat up. This may cause suboptimal reactor performance due to inadequate heat transfer, higher pressure drop, and increased diffusional resistances. The potential also exists for catalyst attrition due to crushing forces when the tube contracts. Non-uniform reforming activity along the length of the tube can cause hot spots raising the tube wall temperature above safe value. Attempts have been made to address these problems by providing support structures to hold the catalyst particles in position or dividing the catalyst bed within the tube into multiple beds with support structures in between, however these add complexities and can result in undesirable higher pressure drop.

Structured catalyst inserts with metal substrates of different shapes have been proposed, for example U.S. patents such as U.S. Pat. Nos. 4,402,871; 4,162,993; 4,350,617; 7,968,208 disclose metal substrates of different shapes as catalyst carriers for gas cleaning applications. These can be formed starting with a metal substrate such as foil or mesh, and engineered into a particular shape. An interfacial layer containing one or more active metals or alloys can be deposited on the engineered shape to provide catalytic functionality. An intermediate interfacial layer may be deposited between the metal substrate and the catalyst containing interfacial layer to enhance structural integrity of thus formed outer catalyst containing interfacial layer. In some instances the proposed structured catalyst can be formed as a single element, and in some instances assembled from multiple elements. However, structured catalyst inserts for use in conventional SMR reformer tubes have their own design requirements, such as higher heat flux, turbulent gas mixing, lower pressure drop, and high reforming capacity. U.S. Pat. No. 7,320,778 B2 and U.S. Pat. No. 7,906,079 B2 disclose stackable structural catalysts with a central rod as support component for use in reforming reactors. The catalytic elements are formed as radial monoliths having corrugated metal leaves or fins to facilitate catalytic reaction, and the central rod provides structural support to the radial monoliths. U.S. Pat. No. 7,871,579 B2 developed the radially expandable catalyst inserts made of corrugated metal sheets for tubular reactors in order to maintain the gap between the orifice opening and the tube inside wall and adjust for tube creep. U.S. Pat. No. 5,599,509 discloses a metal catalyst converter in the honeycomb body created by alternately winding flat sheet and corrugated sheet. The corrugated sheets are disclosed to contain a plurality of slit matrix extended in a direction perpendicular to the exhaust gas direction in order to improve gas communications between each layer of corrugated metal sheet. Most of these works applied high temperature stable metal sheets and configured at least one corrugated metal substrate to form desirable geometry for maximizing catalytic activity and heat transfer while minimizing pressure drop. However, it is difficult to implement these corrugated metal substrates in small diameter reactors with high aspect ratios because the restrictions of tubing dimension limit the manufacturability of corrugated metal sheet based catalyst inserts and their surface area availability.

Gas hourly space velocity (GHSV) determined by dividing the volumetric flow rate of reactants at standard temperature and pressure of 0° C. and 1 atm by the amount of reforming catalysts (i.e. active metals with ceramic oxide carriers) in the reactor is commonly used to describe reactor reforming capacity. Tubular reactors in SMR plants using pellet catalysts typically operate in the range of about of 10,000 to 150,000 $cm^3$/(hr g-cat). These tubular reactors are typically made of high temperature stable metal alloys such as Inconel 625 or 800 HT with an inside diameter (ID) in the range of about 4 inches to about 10 inches, and a length in the range of about 20 feet to about 40 feet. Thus, the ratio of reactor length to inside diameter also referred to as reactor aspect ratio ranges from about 24 to about 120. Depending on the geometry of the ceramic supports, the available surface area for catalyst coating is in the range of 500 to 1000 $m^2/m^3$. Typical particulate reforming catalysts contains Ni as the active metal on aluminum oxide support. Thickness of catalyst coating on the ceramic supports is generally less than 200 micrometer. These known catalyst particles have a lower coefficient of thermal expansion as well as a lower thermal conductivity than the metal tubes containing them. Another important factor that commonly used to describe reactor reforming capacity of a tubular reactor is the heat transfer rate. Surface heat flux is referred to as the rate of heat energy transfer through the reactor walls for a given tube surface area, while the volumetric heat flux is referred to the rate of heat energy transfer through the reactor walls for a given tube interior volume. Surface heat flux of typical full-size SMR reactor tubes at operational temperature ranges from about 100 to 200 $kW/m^2$ and volumetric heat flux ranges from about 1000 to 8000 $kW/m^3$.

Smaller diameter catalytic reactors can offer several advantages, for example improving heat transfer from external heat source to reaction mixture in the tube, enhancing tube life-time by reducing thermal gradients, reducing metal material use, and being applicable for compact steam reformer systems. Therefore, there are many works on exploring small diameter catalytic reactors. For example, U.S. Pat. No. 5,932,141 discloses a process of syngas production in series of tubular reactors with small diameter tube (e.g., 35 mm inside diameter) by applying a thin film of steam reforming catalyst on the inner wall of the tubular reactor. A different approach is described by U.S. Patent No. 20100178219 which discloses a highly heat integrated steam reformer/combustor assembly (or so-called 'catalytic heat exchanger') by coating the reforming catalysts and combustion catalysts on tubing walls.

To achieve similar production capacity as SMR plants, small diameter tubular reactors require a plurality of tubing components in series (high aspect) and much higher space velocity. It is challenging for direct catalyst coating on tubing wall to achieve high hydrocarbon conversion due to limitation of catalytic surface area and coating delamination at high operating temperature and large temperature gradient across tube wall.

The method of the invention overcomes the deficiencies of the prior art and allows efficient use of high aspect ratio catalytic reactors with tube inside diameter (ID) ranging from about 0.2 inches to about 2 inches. The method of the invention utilizes a metal foil having 3-dimensional surface features, rolled into a structure that serves as a catalyst carrier. Although the high temperature metal foils such as FeCralloy have been used in catalytic reactors in the past, they have not been usefully employed in high aspect ratio reactors because of the difficulty in establishing a stable supporting structure with adequate open gas channels. The catalyst inserts, structured monoliths of the present invention can be configured with a single layer metal sheet stamped with a plurality of peaks and grooves. Peaks on metal sheets serve as geometry support to prevent structure deformation and create multiples of open channels for reactant gas flow, while grooves on metal sheets provide open windows for gas communications between each layer of the monoliths. Different stamped patterns on metal sheet form designed peaks and grooves for various dimension of reactor tubing with inside diameter ranging from about 0.2 inch to about 2 inches. These metal monoliths with porosity from about 50% to about 85% significantly reduce the pressure drop in high aspect ratio reactor and provide sufficient catalytic surface area in steam methane reforming process. The present invention allows for the efficient use of metal foil comprising plurality of designed patterns on its surface, rolled into a multi-layer spiral shaped like a compact foil cylinder and catalyzed to serve as a catalyst insert in a high aspect ratio reactor. The designed patterns establish open gas channels between each of the rolled layers. This unique geometry accelerates gas mixing and the large surface area of metal foil provides a high catalytic active surface area.

With the present invention a novel reforming reactor configuration is also proposed. The reforming reactor utilizes one or more metallic tubular elements coupled together to form a reaction volume having an entrance for reactants at one end and an exit at the opposite end for reaction products. The reaction volume contains a plurality of catalyst inserts also referred to as catalyzed metal structures. The catalyzed metal structures can undergo thermal expansion when operating at elevated temperature without experiencing crushing forces from the reactor wall.

SUMMARY OF THE INVENTION

The present invention, in one embodiment, relates to high efficient tubular catalytic steam reforming reactor with aspect ratio from 50 to 1,000 and tube inside diameter (ID) of from about 0.2 inch to about 2 inches. The present invention, in another embodiment, relates to plurality of small diameter, high aspect ratio, multi-pass tubular catalytic steam reforming reactors loaded with rolled catalyst inserts positioned in a non-vertical parallel configuration thermally coupled with a heat source such as oxygen transport membrane reactors. This unique arrangement allows rolled catalyst inserts to be self-supported on the reactor wall, efficient heat transfer from the reactor wall to the reactor interior, improved gas mixing within reactor interior while achieving lower pressure drop than known particulate catalysts. The present invention, in yet another embodiment relates to a catalyst insert that comprises at least one reforming catalyst and a metal catalyst carrier; said metal catalyst carrier is a three-dimensional metal sheet treated to have surface features comprising a plurality of grooves and peaks and then rolled into a multi-layer spiral, wherein said plurality of peaks and grooves provide mechanical support for each rolled layer of said spiral and establish open channels through which gas can pass between the multi-layers of said spiral, wherein said rolled multi-layer spiral has a porosity of from about 50% to about 85%. The reactor has an aspect ratio from 50 to 1,000, preferably from 100 to 600. The catalyst insert is formed from a metal sheet having a thickness of from about 50 micrometer to about 1000 micrometer. The metal sheet can be fabricated from stainless steel, carbon steel, FeCrAlloy, Hastelloy®, Haynes and combinations thereof. The catalyst insert is capable of catalyzing reforming reactions and contains at least one Group VIII transition metal such as nickel, cobalt, rhenium, iridium, rhodium, ruthenium, platinum, or combinations thereof. The catalyst is coated onto said catalyst insert substrate by wash-coating, dip-coating, spray deposition, tape-casting of suspension or sol-gel catalyst slurry. The coating slurry comprises one or more of the following: catalyst, catalyst carriers, high temperature stabilizers, coking resistant promoters, organic binders, dispersant and mixtures and combinations thereof. The organic binder can be polyvinyl butyral (PVB).

In another embodiment the present invention is a catalytic reactor comprising a plurality of catalyst inserts; the reactor having an inlet, an outlet, an exterior surface to receive heat, an interior volume defining a fluid flow passageway of length "L" between the inlet and the outlet; the outlet is spaced apart from the inlet at a vertical distance "H"; wherein the ratio "H/L" is less than 0.9 and greater than 0, in another embodiment less than 0.5, and in yet another embodiment less than 0.2 and greater than 0; and the plurality of catalyst inserts occupy at least 80% of the fluid flow passageway length, in another embodiment at most 99% of the fluid flow passageway length. The catalyst insert is formed from a metal foil having defined surface patterns comprising a plurality of grooves and peaks, said foil rolled into a multi-layer spiral monolith, wherein said plurality of peaks and grooves provide mechanical support for each rolled layer of said spiral and establish open channels through which gas can pass between the multi-layers of said spiral. The catalyst insert comprises a metal substrate, an interfacial catalyst layer containing an active ingredient capable of catalyzing endothermic reforming reactions. The active ingredient in the catalyst insert comprises at least one of Ni or Rh. The interfacial catalyst layer has a thickness of at least 10 microns, and generally is in the range of from about 40 microns to about 80 microns.

In yet another embodiment the present invention provides for a process for endothermic reforming of a methane containing feed gas, comprising: providing a reactor element arranged in a non-vertical orientation containing a plurality of catalyzed metallic structures; the reactor element having an inlet, an outlet, an exterior surface to receive heat, an interior volume defining a passageway for fluid flow from the inlet to the outlet; wherein reformer tubes passageway length to tube inside diameter ratio of from about 50 to 1000, in another embodiment at least 100 to 600, and the tube inside diameter is in the range of from about 0.2 inches to 2 inches; the catalyzed metallic structures also referred to as catalyst inserts have porosity of at least 60%, preferably in the range of from about 65% to 75%; wherein the plurality of individual catalyzed metallic structures are lined in series along the fluid flow passageway; the catalyst insert comprises a metal substrate, an interfacial catalyst layer containing an active ingredient capable of catalyzing endothermic reforming reactions; the metal substrate is a metal foil having a 3-D pattern of surface features comprising a plurality of peaks and grooves and said foil rolled into a spiral monolith; the spiral monolith having a characteristic length "$L_m$", an innermost diameter "$d_i$", an outermost diameter "$d_m$"; a characteristic spacing "$h_m$" between layers; the ratio of length $L_m$ to outermost layer diameter $d_m$ can be from about 0.5 to 20, in another embodiment from about 1 to 12; the ratio of outermost layer diameter $d_m$ to tube inside diameter D can be at least 0.9, preferably as close as 1 as possible. The process further provides for external heat sources and heating the reactor exterior surface to a temperature of from about 600 to about 950° C.; wherein reactor surface heat flux is from about 40 to 75 kW/m$^2$ and the volumetric heat flux is from about 15,000 to 25,000 kW/m$^3$, preferably 17,000 to 20,000 kW/m$^3$. A feed stream containing methane and steam flows through the reactor element at an operating pressure of from about 20 psig to about 400 psig; the steam in feed stream corresponding to a steam to carbon ratio is from about 1.0 to about 3.0; the feed stream having a GHSV of from about 200,000 to 500,000 cm$^3$/(hr g-cat); the feed stream having a residence time of from about 0.1 to 0.3 seconds, wherein the reformed product leaving the reactor has an approach to equilibrium temperature below 10° C. The reactor element can be configured with at least one tubing unit containing a plurality of catalyzed metallic structures; the tubing unit can be configured as one of straight tube, 'U' shape tube, 'J' shape tube or the likes; the tubing units filled with catalyst inserts can be connected in series by welding to form a tubular catalytic reforming reactor. A plurality of tubular catalytic reforming reactors can be arranged non-vertically in a panel array thermally coupled with external heat sources such as electrical heating elements or oxygen transport membrane reactors for conducting endothermic reforming of methane containing feed gas.

The catalyst insert is a catalyzed metallic structure comprising a single strip of metal substrate and a catalytic composite substance capable of catalyzing endothermic reforming reactions; the metal substrate: is formed from the expanded metal foil with high temperature stable properties, preferably iron/chromium/nickel alloy such as FeCrAlloy; the metal structure is a spiral monolith formed by winding a single metal foil; wherein the metal foil has a three-dimensional surface patterns of a plurality of grooves and peaks with uniform height on its surface and the density of peaks is from about 75 to 200 cells per square inch, in another embodiment from about 100 to 150; wherein these peaks are preferably hollow pyramid-shape with at least one facet open; wherein these peaks have equal pitch distance and zigzag patterns on the surface of metal foil; it is preferable for the catalyst insert to be in physical point contact with inside wall of the reforming metal reactor tube. The density of point contact can be at least 30 point contacts per square inch, in another embodiment at least 75 point contacts per square inch, and in still another embodiment at least 100 point contacts per square inch. The shape of these peaks can be one or more of pyramid, sphere, cylinder, cube, and bump; wherein the height of peaks $h_m$ is from about 0.02 inch to about 0.2 inch, in another embodiment from about 0.04 to 0.08 inch; the ratio of peak height $h_m$ to metal foil thickness $t_m$ is from about 1 to 30, in another embodiment from about 5 to 15; The ratio of monolith innermost layer inside diameter $d_1$ to peak height $h_m$ is less than about 5, in another embodiment less than about 3. The innermost layer forms a central hollow core. Reforming catalyst: the catalytic substance comprising the metallic substrates, reforming active metals containing at least one of Ni, Rh, Ru, Co, Pt, Ir, Re, ceramic oxide composite containing at least one of $Al_2O_3$, $ZnO_2$, $TiO_2$, pervoskite, pyrochlore, hexaaluminate, and promoters containing at least one of $La_2O_3$, BaO, SrO, $Y_2O_3$, CaO, MgO, $MoO_2$, WO, $K_2O$, and $CeO_2$; contains a catalyst layer at least 10 microns thick; the thickness of said catalyst layer can be from about 40 microns to about 150 microns; the catalyst layer coating step in the forming of the catalyst layer can be a wash-coating technique.

In another aspect of the invention, a plurality of structured catalyst inserts comprising metallic monoliths are applied in high aspect ratio catalytic reactors to achieve pertinent pressure drop at high space velocity conditions. The substrate monolith is made of high temperature stable metal alloys with high thermal conductivity and low thermal expansion rate. After forming flat thin metal foils by pressed and expanded the metal raw materials, a plurality of designed patterns shaped like peaks, grooves or combinations thereof can be formed on one side or both sides of the foil with ordered arrangements by punching through the metal foil with rows of tilted knives, or stamping the foil with a molds having the mirrored pattern, or passing the metal foil through a pair of die wheels. The metal foil is rolled tightly with the spiral cross-section, as viewed in the direction of the flow of gas through the reactor. The gaps defined by the foil peaks strengthen the spiral monolith structure and prevent monolith deformation during operation. These designed patterns also form a plurality of gas channels to enhance gas turbulence and provide high porosity of the monolith substrate. Grooves on the surface of metal foil enable gas flow between each layer throughout the monolith, which reduces radial thermal gradient and gas local hot or cold spot.

BRIEF DESCRIPTION OF THE DRAWING

While the specification concludes with claims distinctly pointing out the subject matter that applicants regard as their invention, it is believed that the invention would be better understood when taken in connection with the accompanying figures wherein like numbers denote same features throughout and wherein:

DETAILED DESCRIPTION

Catalytic Reactor

Figure 1:
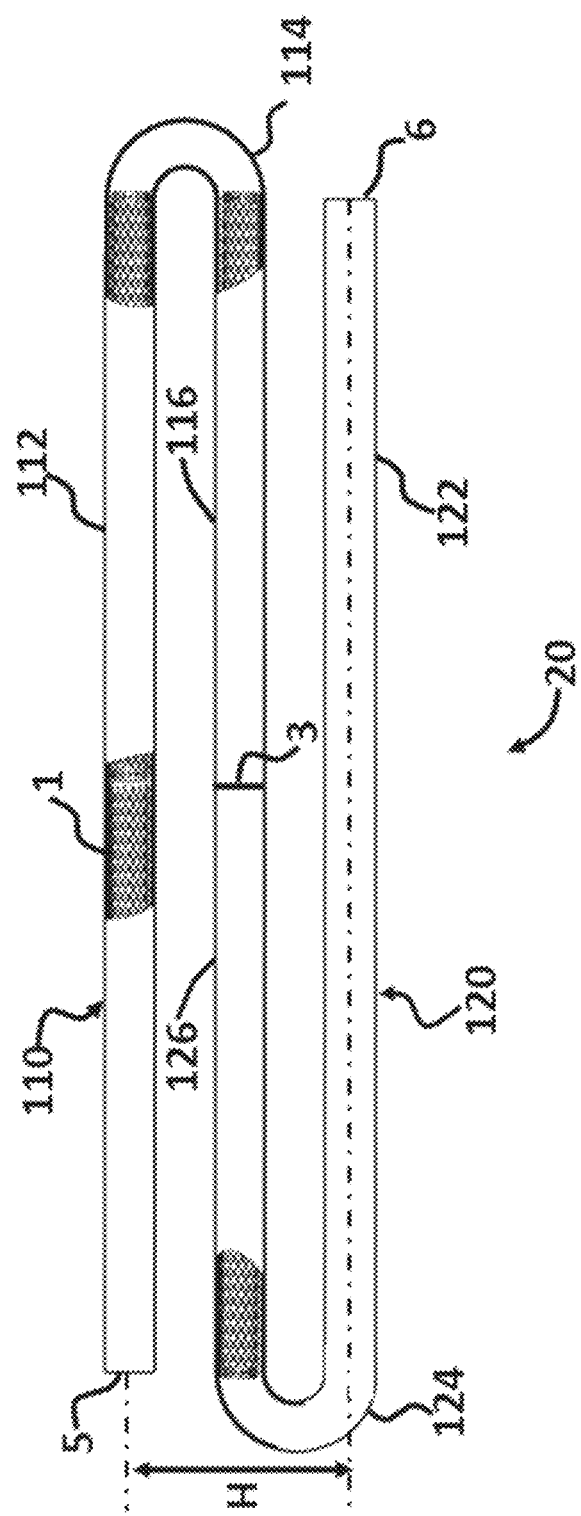
FIG. 1 is a schematic drawing of a high efficient tubular reactor of the present invention.

The present invention relates to high efficient tubular catalytic steam reforming reactor with aspect ratio of from about 50 to 1,000 and tube inside diameter ranging from about 0.2 inch to 2 inch. The tubular reactor can be made of high temperature stable metal alloys such as Inconel 625 or 800 HT. The tubular reactor can be formed from tubes or pipes bent into 'U' or T shape and welded together. FIG. 1 shows a high aspect ratio reactor 20 with 'S' flow path formed using two T shape tubular elements 110 and 120. The tubular element 110 can be formed from a metal tube or pipe of Inconel 625 or 800 HT with an inside diameter "D" by bending the tube or pipe to have a first straight leg 112, a U-bend 114, and a second straight leg 116. The tubular element 120 can be formed by bending another similar tube or pipe to have a first straight leg 122, a U-bend 124, and a second straight leg 126. A plurality of catalyst inserts 1 (to be described later) are housed in the straight legs of tubular elements 110 and 120. Few of the catalyst inserts are shown in cut-away sections of tubular element 110. The tubular elements 110 and 120 loaded with catalyst inserts are spot-welded 3 to form the tubular reactor 20 having an inlet 5 to introduce reactants into the reactor, an outlet 6 through which the reaction products leave, and a fluid flow passageway of length "L" between the inlet 5 and the outlet 6. The aspect ratio of the tubular reactor can be determined by dividing the length "L" by the inside diameter "D".

In one embodiment, the invention relates to highly efficient tubular catalytic steam reforming reactor with an aspect ratio of from about 50 to 1000 and tube inside diameter of from about 0.2 inches to 2 inches. In another embodiment, the tubular catalytic steam reforming reactor of the invention has an aspect ratio of from 150 to 600 and tube inside diameter of from about 0.5 inches to 2 inches.

Conventional SMR or ATR reactors utilize tubes with inside diameter ranging from 4 inches to 10 inches and aspect ratios typically from about 10 to 120 in order to minimize pressure drop and reduce thermal gradient across the reactor. Commercially available structured catalysts (such as ceramic cordierite inserts and metallic foil substrates) are known. However, high efficient tubular catalytic steam reforming reactors with tube inside diameter from about 0.2 inches to about 2 inches and high aspect ratios have limited catalyst options to optimize the catalytic performance due to design constraints.

Catalyst Insert

In another embodiment, the invention relates to catalyst insert 1 with small outside diameter of from about 0.2 inches to about 2 inches for use in high aspect ratio catalytic reactors. The catalyst insert of the invention has high thermal conductivity and mechanical stability. Metal substrates that can usefully be employed to form the catalyst insert of the invention include stainless steel, carbon steel, FeCrAlloy, Hastelloy®, Haynes and the like. In one embodiment FeCrAlloy metal alloy is the metal substrate of choice because of its relatively low coefficient of thermal expansion ($<0.000015°$ C.$^{-1}$ at 20 to 100° C.). Besides iron and chrome, Fecralloy also contains at least 4% of aluminum, thus having an inherent ability to form an aluminum oxide layer upon exposure to an oxidative environment at high temperatures. This aluminum oxide layer significantly improves catalyst coating adhesion to the metal substrate.

Figure 2:
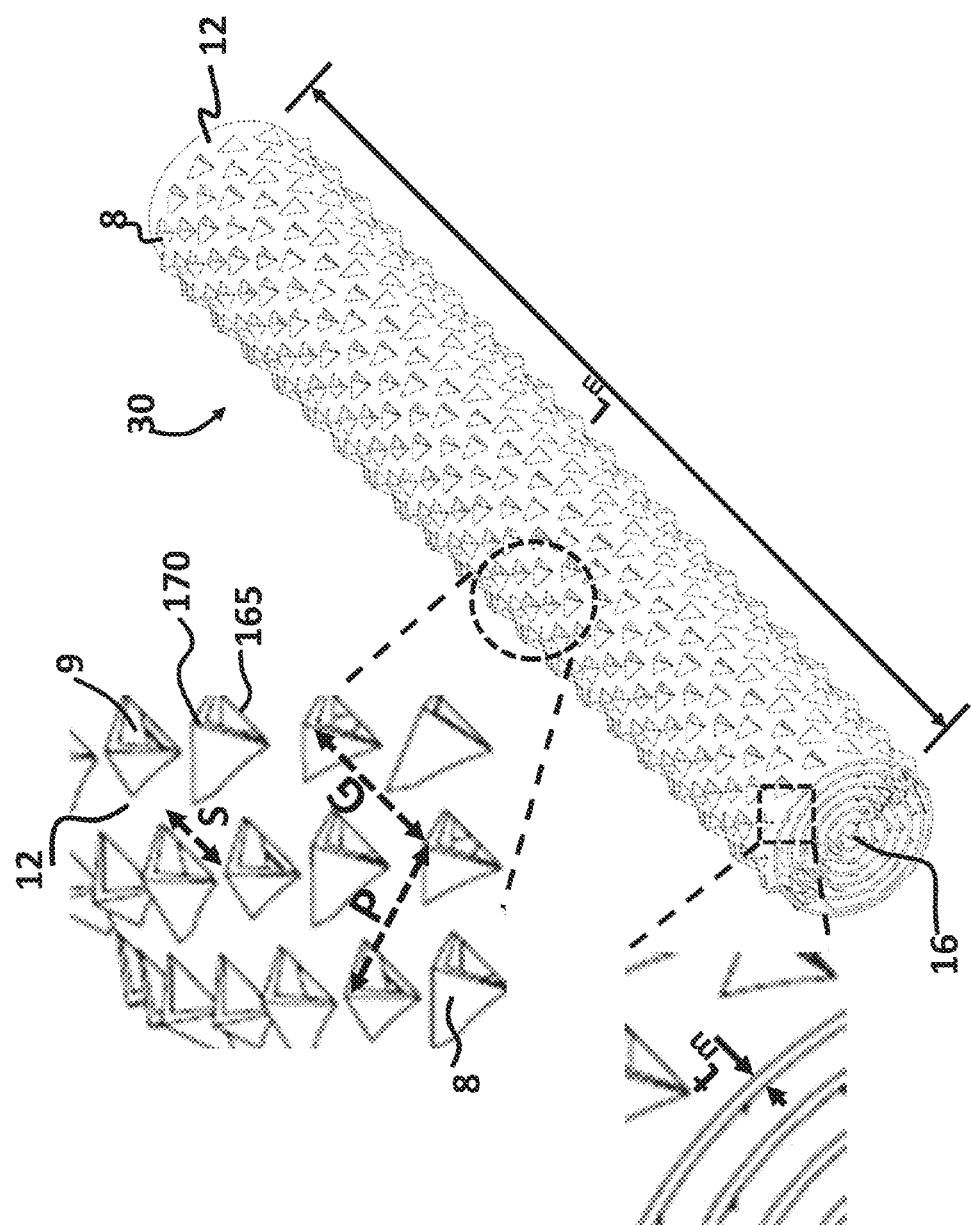
FIG. 2 is a schematic drawing of a structured metal substrate of the present invention.
Figure 3:
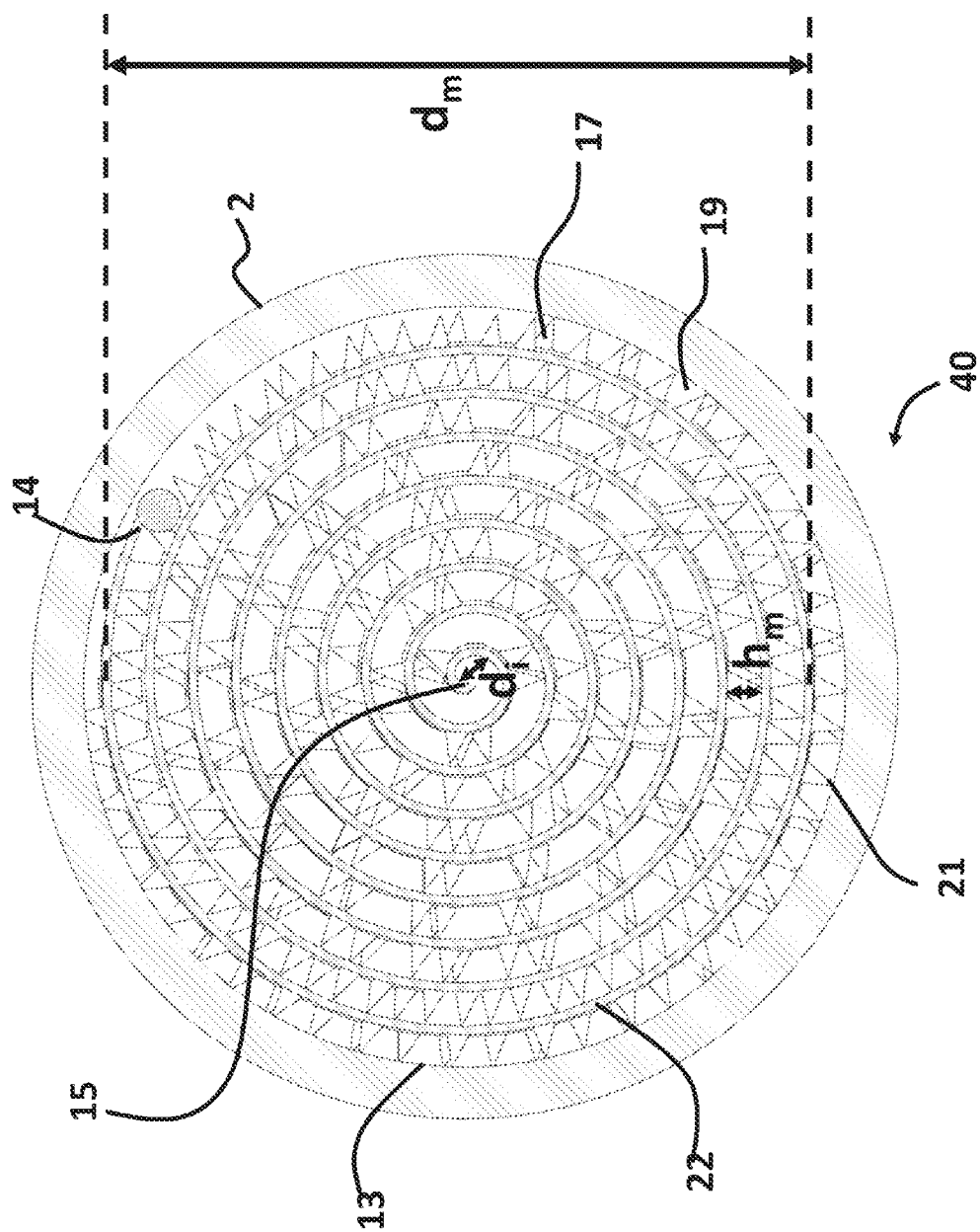
FIG. 3 is a schematic drawing of a cross-section of the catalyst insert of the present invention.

FIG. 2 shows a perspective view of a spiral monolith 30 that serves as the metallic substrate upon which an interfacial layer of active metal is deposited to form the catalyst insert 1. FIG. 3 shows a radial cross-section view of a tubular reactor 20 containing the catalyst insert 1.

With reference to FIG. 2, spiral monolith 30 from hereon also referred to as a catalyst insert substrate is formed from a single strip of metal sheet 12, also referred to as metal foil or expanded metal foil. A plurality of designed patterns (cells) 8 are formed on the surface of the metal foil 12 prior to forming the spiral monolith 30. The designed patterns from here on are also referred to as 3-dimensional surface features or surface features. The designed patterns can be configured to have projections (peaks) 170, formed either on one side or both sides of the foil by punching through the metal foil with rows of tilted knives, or stamping the foil with molds having a desired mirrored pattern, or passing the metal foil through a pair of die wheels. The tensile strength and yield strength of the patterned metal foil are both preferably above 70,000 psi. To maintain the desired tensile strength and rolling flexibility of expanded metal foil, the metal foil 12 has a thickness $t_m$ preferably ranging from about 100 micrometer to about 1000 micrometer, in another embodiment from about 150 to 300 micrometer. The geometry of designed patterns on the foil surface can be varied from sphere, cylinder, bump, cube, or preferably pyramid (as shown in FIG. 2). These patterns are created by forming a plurality of grooves (slits) 165 with length of S on metal foil surface and then deforming the metal surface, forming peaks 170 with reference of grooves to create hollow structures on the metal surface 12. It is preferable to have at least one facet of each pattern open by grooving the metal foil for facilitating gas communication between layers in the spiral monolith structure. For the monolith 30 with pyramid-shape patterns, the facet 9 on individual pattern is fully cut through, perpendicular to gas flow passage to prevent any local hot or cold spots and any dead-end zones in an operational tubular reactor. The height $h_m$ of peaks 170 is substantially uniform throughout the foil to ensure consistent spacing between layers of the spiral monolith 30. To reduce the possibility of peaks nesting together and channels collapsing, the surface should have at least two rows of patterns, preferably arranged in a zigzag manner, and the peak density is from about 75 to about 200 cells per square inch (cpsi), in another embodiment from about 100 to about 150 cpsi. The pitch of peaks P refers to the distance between two adjacent peaks in a row that is perpendicular to mainstream fluid flow while the gap of peaks G refers to the distance between two peaks in adjacent rows. The ratio of P/G can be from about 0.1 to 4, in another embodiment from about 0.5 to 2, in order to enhance mechanical support between layers in the spiral monolith 30. Mixing of reactants flowing through different layers of spiral monolith depends on several factors, including P/G value. The pitch value P can also be varied along the row to further eliminate the peak overlap on adjacent layers of monolith 30. The length of individual spiral monolith $L_m$ is determined to ensure homogenous catalyst coating on the monolith and also to prevent large temperature gradient across individual monolith.

With reference to FIG. 2 and FIG. 3, the metal foil having 3-dimensional surface features is rolled to form spiral monolith 30 having an innermost layer (inner layer) 15 and an outermost layer (outer layer) 22. The ratio of length $L_m$ to the outside diameter of the spiral monolith outermost layer $d_m$ is preferably controlled to be from about 1 to 15, in another embodiment from about 2 to 10. The innermost innermost layer forms a hollow central core 16. After the metal foil is rolled tightly into a monolith form, the monolith structure is secured by bonding the edge 14 of the outermost layer to the structure with known welding techniques, such as point-welding. It is preferable to have the peaks 17 on the outer layer 22 of monolith facing towards the reactor tube inside wall 13 of high efficient tubular reactor 2. To improve the physical contact between monolith 30 and reactor 2, the ratio of $(d_m+2h_m)/D$ can be at least 0.9, preferably at least 0.95, and preferably close to 1. Conventional structured catalysts such as corrugated metallic foil supporting catalysts generally have either faces or edges in physical contact with reforming tube inside wall. It is challenging to load/unload these conventional catalyst elements in the reformer if their outer diameter is close to the reformer tube inside diameter, because catalyst coating on the contact face tends to be scrapped and delaminated from the metallic substrate, which results in damaging the catalyst coating and reducing the catalytic surface area. The present invention allows only point contacts between the catalyst inside outermost layer and the inside wall of the tubular reactor, thus avoiding scraping or delamination of catalyst coating. For example, portions of the outer layer peaks 17 of monolith shown in FIG. 3 have direct point contacts 21 with tube inside wall and significantly increase heat conduction between monolith 30 and reforming tube 2, and ultimately improve overall heat flux in reformer. Average density of peak point contact 21 on tube inside wall is at least 30 points per square inch of tube inside wall, preferably at least 75 points per square inch, more preferably at least 100 points per square inch. By attaching to the tube inside wall 13, these peaks 17 define the gap between monolith 30 and reformer tube 2 and also secure the position of monolith in the reformer to prevent any physical movement of catalyst inserts 1, especially during reformer start-up, shut-down, and transient periods. Different from conventional reforming catalyst elements (pellets or structured catalysts) contained in vertical tubular reformers, the catalyst inserts of this invention have a feature of self-supporting themselves on the reactor tube inside wall and enable non-vertical reformer configurations. The monolith inner most layer 15 has an inside diameter $d_1$ that is preferably less than 3 times of peak height $h_m$, more preferably less than the peak height $h_m$. To reduce the fluid flow boundary layer effect on the surface of reforming tube inside wall 13 and structured monolith 30, the distance between layers of monolith 30 determined by the peak height $h_m$ is controlled to be from about 0.02 to 0.20 inch, in another embodiment from about 0.04 to 0.08 inch.

Active Metal Composites and Catalyst Coating

The preferred reforming catalysts include Group VIII transition metals such as nickel, cobalt, rhenium, iridium, rhodium, ruthenium, platinum, or their combinations. The active metal catalyst ceramic support candidates could be high surface area ceramic materials such as $Al_2O_3$, $ZnO_2$, $TiO_2$, pervoskite, pyrochlore, hexaaluminate supports, or mixtures of these materials. The high temperature promoters may include $La_2O_3$, BaO, SrO, $Y_2O_3$, and spinel structured materials, or mixtures of these materials. The coking resistant promoters may include Ca, Mg, Mo, W, K, and Ce. Organic binders improve the coating layer adhesion and also affect the morphology of final catalyst layer. So it is preferred to pre-mix the organic binders with alcohol solvent (e.g., 12 wt. % PVB in isopropyl alcohol) to enhance its homogenous mix before adding into other ingredients.

In the catalyst coating stage, several critical factors need to be considered to achieve better catalyst performance, including adhesion to the substrate, thermal stability, coating thickness, catalytic activity, and corrosion resistance. To improve metal substrate adhesion with coating layer, substrate surface pre-treatments are applied. The comprehensive reviews on methods for catalyst coating of metallic structured substrates have been reported by Montebelli et al. and Protasova et al. FeCrAlloy metal substrate is preferred since it can form aluminum oxide layer with thickness from 1 to 5 micrometer when exposed to air at high temperature from 900 to 1050° C. Common catalyst coating techniques such as wash-coating, dip-coating, spray deposition, and tape-casting of suspension or sol-gel catalyst slurry can be applied to form the catalyst layer. The ingredients of a coating slurry can include one or more of the following: active metal precursors in the form of metal or metal oxide or metal precursors such as metal nitrate, ceramic oxides serving as active metal carriers, high temperature stabilizers and coking resistant promoters, organic plastic binders such as PVB, and optionally dispersants, in either aqueous or alcohol or toluene solvents. Alternately mixtures of catalyst active metals and ceramic carrier powders or commercially available supported catalyst powders can be milled to desired particle size prior to prepare the slurry for coating on the metallic substrate. Yet another alternate is to pre-coat the ceramic composites such as $Al_2O_3$, YSZ, or $CeO_2$ on the surface of metallic substrate to enhance the surface morphology and then impregnate with active metal precursors after high temperature sintering.

The method of dip-coating metallic structure in the sol-gel catalyst slurry is commonly applied since it simplifies the coating process and ensures entire coating of substrate. Adhesion of final coating on metal monolith is controlled by several key parameters such as slurry viscosity, ceramic powder and active metal particle size, drying temperature and time, coating thickness, substrate surface morphologies. Viscosity of slurry can be adjusted by the amounts of solvent, ceramic powder, plastic binders, and dispersants. Compared to conventional metallic substrate with flat surface, the spiral monolith 30 of the present invention has a plurality of designed patterns 8 on its surface and improves the surface roughness to retain catalyst coating and enhance coating adhesion. To prevent any channel blockage with excessive coating slurry, individual coated monoliths are purged with dried air. The coated monoliths are air calcined at temperature range from 400 to 800° C. to remove organic binders or solvent and further enhance adhesion of the coating.

Reactor Assembly

The present invention relates to high efficient tubular reactor 20 to convert a hydrocarbon-containing feed stream into hydrogen and carbon monoxide containing product stream by steam reforming. In one embodiment the tubular reactor is positioned in a housing containing a heat source that radiates heat to the tubular reactor 20 to support steam reforming reactions occurring inside the reactor. The heat source can be electric heating means, burners, and/or oxygen transport membrane reactors. The tubular reactor is positioned inside the housing such that the inlet 5 is spaced from the outlet 6 at a distance of "H" in the vertical plane that is less than the length "L" of the tubular reactor fluid flow passageway between the inlet and the outlet. In one embodiment, the ratio of "H" to "L" is from about zero to about 0.9. In another preferred embodiment the ratio of "H" to "L" is from about zero to about 0.5.

The tubular reactor 20 contains a plurality of catalyst inserts. The multi-pass reactor tube configuration provides excellent thermal coupling with external radiant heat sources such as oxygen transport membrane reactor discussed in pending U.S. Patent Publication 2015/0098868, which is incorporated herein by reference. The reforming tubes are preferably made from suitable wrought materials like Incoloy 625 or 800HT. Structured catalyst inserts 1 are filled tightly into a 'S' tube reformer 20 with small/no gap between individual catalyst inserts in order to prevent physical movement of catalyst inserts during operating environments. Because the outermost layer diameter $d_m$ of catalyst insert 1 is designed to be close to the inside diameter of reforming tube 20 to enhance heat transfer from tube wall to catalyst inserts 1, there is no catalyst contained in the U-turn zone 4 that can cause gas flow blockage. The adjacent catalyst inserts are also secured by the U-turn 4.

Since the ratio of $(d_m+2h_m)/D$ can be designed above 0.9, preferably at least 0.95, the catalyst inserts 1 are self-supported on tube inside wall and the catalytic reformer units can be arranged in non-vertical orientation. This feature provides more flexibility for compact reactor integration than conventional vertical reformer design.

A hydrocarbon containing feed stream, preferably natural gas, is preheated to around 370° C. and mixed with superheated steam to produce a mixed feed stream with a steam to carbon ratio of from about 1.0 and 3.0. The superheated steam is preferably between 300° C. and 600° C. The mixed stream is further heated to 600° C. to 750° C. before entering the inlet 4 of catalytic reformer unit 20.

Figure 4:
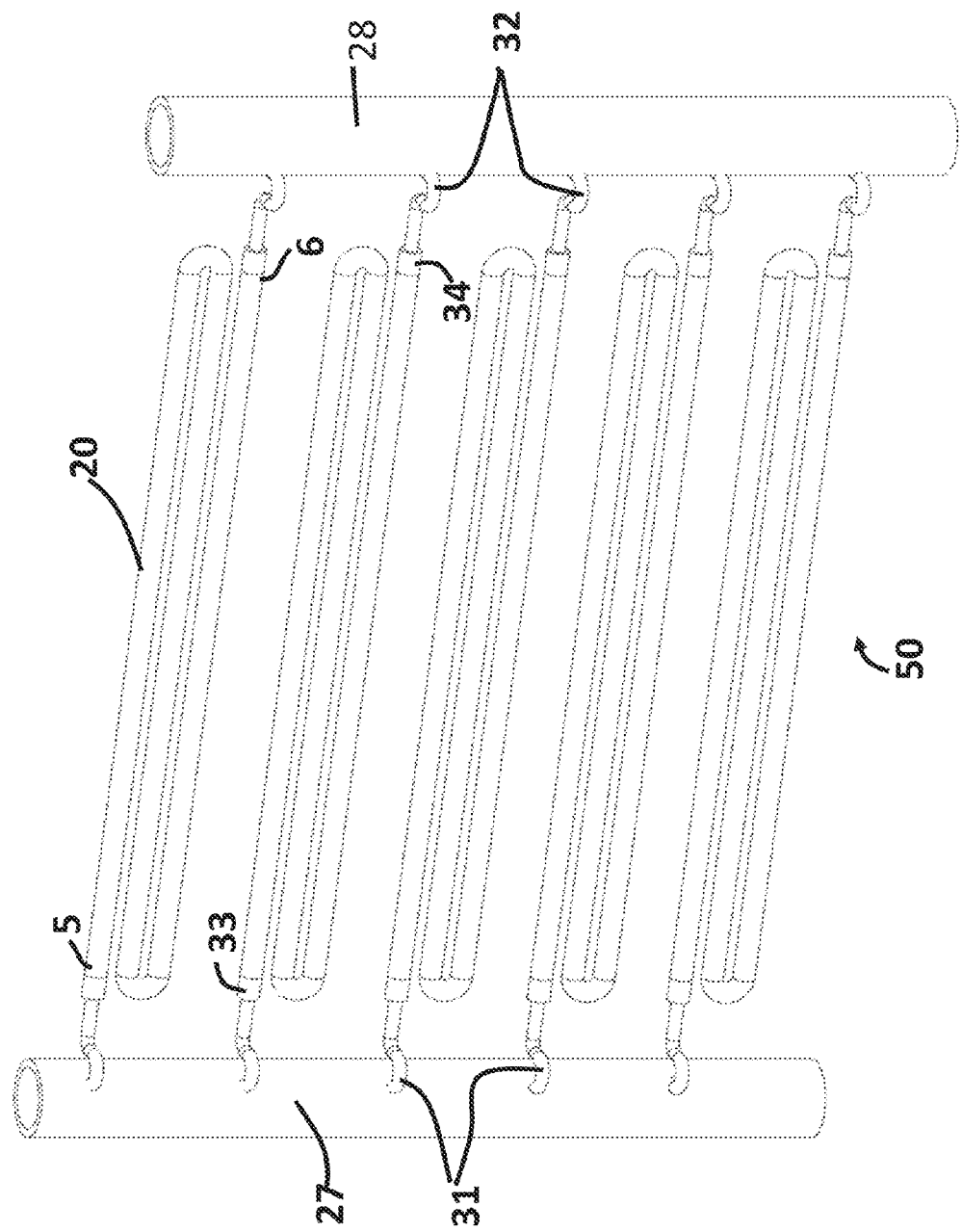
FIG. 4 is a reforming reactor assembly utilizing a plurality of tubular reactors of the present invention.

With reference to FIG. 4, a plurality of tubular reactors 20 can be arranged to configure a reforming reactor panel assembly 50. Even though only five tubular reactors are shown, reforming reactor panel assembly can be configured with fewer than 5 reactors or more than 5 reactors to meet desired syngas production rate. A metal frame (not shown) is preferably stamped or cut, and folded or formed, and welded together to create a frame structure with structural rails capable of holding or retaining the plurality of tubular reactors, in vertical or non-vertical orientation. In one preferred embodiment the high efficient tubular reactors 20 are arranged in a non-vertical orientation. The tubular reactor inlet 5 is spaced apart from the outlet 6 at a distance "H" in the vertical direction. This way the catalyst inserts 1 rest on the reactor wall. The tubular reactors in the reactor assembly can be configured to operate at GHSV greater than 200,000 $cm^3/(hr \cdot g\text{-}cat)$, which is considerably greater than that of conventional SMR reactors, at operating temperatures of from 750 to 950° C.

In one embodiment, the plurality of reforming tubes 20 are welded to an inlet manifold 27 and outlet manifold 28. The inlet manifold 27 and the outlet manifold 28 are welded to the frame members (FIG. 4, frame not shown). The reactors 20 are connected to the feed manifold 27 and the product outlet manifold 28 via pigtail connectors 31 and 32, respectively. End caps 33 and 34 facilitate the transition from the reformer tubes to small diameter metal pigtails 31 and 32, respectively. Multi-pass arrangement of reformer unit 20 is beneficial on reducing the amounts of pigtails 31, 32 and caps 33, 34. Besides the connection of pigtails to manifolds, the catalytic reformer units 20 could have mechanical support on the metal frame (not shown in the Figure). This catalytic reforming reactor panel assembly 50 can be thermally coupled with radiant heating sources such as electrical heating elements or oxygen transport membrane reactors. By integrating structured monolith catalysts 1 into the catalytic panel 50, heat flux from reforming tube outer wall to internal reactants is enhanced and helps reduce the maximum tube wall temperature and improves metal tubing creep-life.

The catalytic reformer panel 50 can be configured to operate at relatively high pressure (e.g., above 200 psig) in order to reduce overall system pressure drop and facilitate uniform gas flow across each catalytic reactor unit 20 in the panel. To increase overall syngas production capacity, the reactor can be operated at high space velocity above 100,000 $cm^3/(hr \cdot g\cdot cat)$, preferably from about 200,000 to 500,000 $cm^3/(hr \cdot g\cdot cat)$. Multi-pass arrangements of catalytic reforming reactors 20 improve the thermal-coupling between endothermic reforming tubes with external heating sources such as electrical heating elements or oxygen transport membrane reactors. Heat flux of the catalytic panel 50 is enhanced by the direct thermal contact between the plurality of catalyst inserts 1 and interior wall 13 of reforming tube 20. The overall heat flux of panel 50 is from about 40 to 75 $kW/m^2$, in another embodiment from about 50 to 75 $kW/m^2$. Another aspect on evaluating system heat energy transfer is the rate of heat distribution in a given reactor interior volume, namely volumetric heat flux. The volumetric heat flux of catalytic panel 50 is from about 15,000 to 25,000 $kW/m^3$.

EXAMPLES

The invention will now be illustrated by following non-limiting examples. Tests were conducted using a "U" shape reactor made up of 800HT alloy, having a total tube length of 51 inch. In examples 1 to 3 described below, a 'U' shape 800HT piping reactor of 12.7 mm (0.5 inch) inside diameter (ID) with fluid flow passageway length from hereon also referred to as path length of 1295 mm (51 inch) was used. In Example 1, the reactor was loaded with catalyst inserts of present invention. A metallic spiral monolith formed by winding a single-strip of expanded metal foil having 3-dimensional surface features served as the substrate for Ni— Rh reforming catalyst coating. In Example 2, the reactor was loaded with commercial steam reforming catalyst HyPro-Gen® R-70 obtained from Clariant Catalyst Corporation (KY, USA). It was selected as a baseline due to its acceptable packing density in the studied reactor with inside diameter of 0.5 inch. In Example 3, the reactor was loaded with catalyzed corrugated monoliths. A single-strip of corrugated FeCrAlloy foil was rolled to form corrugated monoliths as the substrate for catalyst coating. Conventional metallic monolith substrates wound with one strip of corrugated metal foils on one strip of flat metal foil have their hydraulic outer diameter typically greater than 25.4 mm (1.0 inch). Thus, in order to include the example of these conventional metallic substrates, the commercially available corrugated monolith substrates with outside diameter of 1.0 inch was used as metallic substrate in Example 4 for catalyst coating and resulting catalyzed conventional corrugated monolith was tested in a 'U' shape 800HT tubing reactor with path length of 1295 mm (51 inch) and inside diameter of 28.4 mm (1.1 inch).

In the test unit the catalytic reforming reactor is fully embedded in an electrical-heating furnace having three heating zones. Mixture of methane and water (S/C of 1.5) is preheated to 300° C. by electrical-heating coil before reaching the furnace. Another metal coil attached to the inlet of catalytic reactor is also fully embedded in the electrical-heating furnace and it further heats the feed mixture to about 620° C. before entering the catalytic reactor. K-type thermocouples are applied to measure the temperature profile of catalytic reactor wall and feed mixture. One thermocouple is attached to inlet of the catalytic reformer outside wall, about 1 inch away from the entry, while another thermocouple is attached to the outlet of the reformer outside wall, about 1 inch away from the exit. Another thermocouple is inserted to measure exit gas temperature of the catalytic reactor. A differential pressure transducer is used to measure the pressure drop between the catalytic reactor entry and exit. By adjusting the furnace temperature set point, reforming reactor exit gas temperature can be controlled between 800 to 900° C. The effluent gas products are quenched through a chiller down to room temperature (close to 20° C.) and condensed water is separated. The gas composition and methane conversion gas is determined by real-time sampling and gas chromatography.

Example 1: Catalyst Inserts

Ferritic chromium steel containing 5.5% aluminum and 0.12% rare earth elements is used as the metallic substrate material. FeCralloy cylinder of 200 mm diameter was first pressed and expanded into a flat metal square foil with thickness of 150 µm. The metal foil was then moved to the stamping machine having rows of tilted blades. Distance of adjacent row of tilted blades was 4 mm and the pitch distance of titled blades in each row was 2.5 mm. The effective blade length was close to 6 mm. The array of blades in zigzag arrangement first slit on one side of the metal foil to form a plurality of cuts and multiples of peaks, then formed on the other side by sandwiching the foil with the blade array and a mold located underneath the foil. The supporting mold was pre-grooved with designed pyramid pattern. The stamped metal foil was cut into a plurality of small square metal foils with dimension of 101 mm (4 inch)×178 mm (7 inch). The tensile strength and yield strength of the stamped foil are 87,000 psi and 73,000 psi, respectively. Each small foil sample was then rolled tightly from one edge to form a single-layer spiral cylinder with length $L_m$ of 101 mm (4 inch) and outermost layer outside diameter $d_m$ of 10.2 mm (0.41 inch). After securing the structure by point-weld on three different locations on the outer edge of foil, the monolith forms the spiral structure as shown in FIG. 2. The pitch distance P of peaks in same row is 2.5 mm and gap distance G between each row is 4 mm, resulting in peak density of 130 cpsi. The height $h_m$ of peaks 170 is close to 1000 micrometer. Individual pattern is in the form of a hollow pyramid structure with one facet open perpendicular to the main stream gas flow. The overall porosity of metallic monolith 30 determined by dividing the metal foil volume (length*width*thickness) by the volume of tubular reactor containing the catalyst insert (pi*tubular reactor inside diameter^2*insert length/4) is about 80%.

Figure 5:
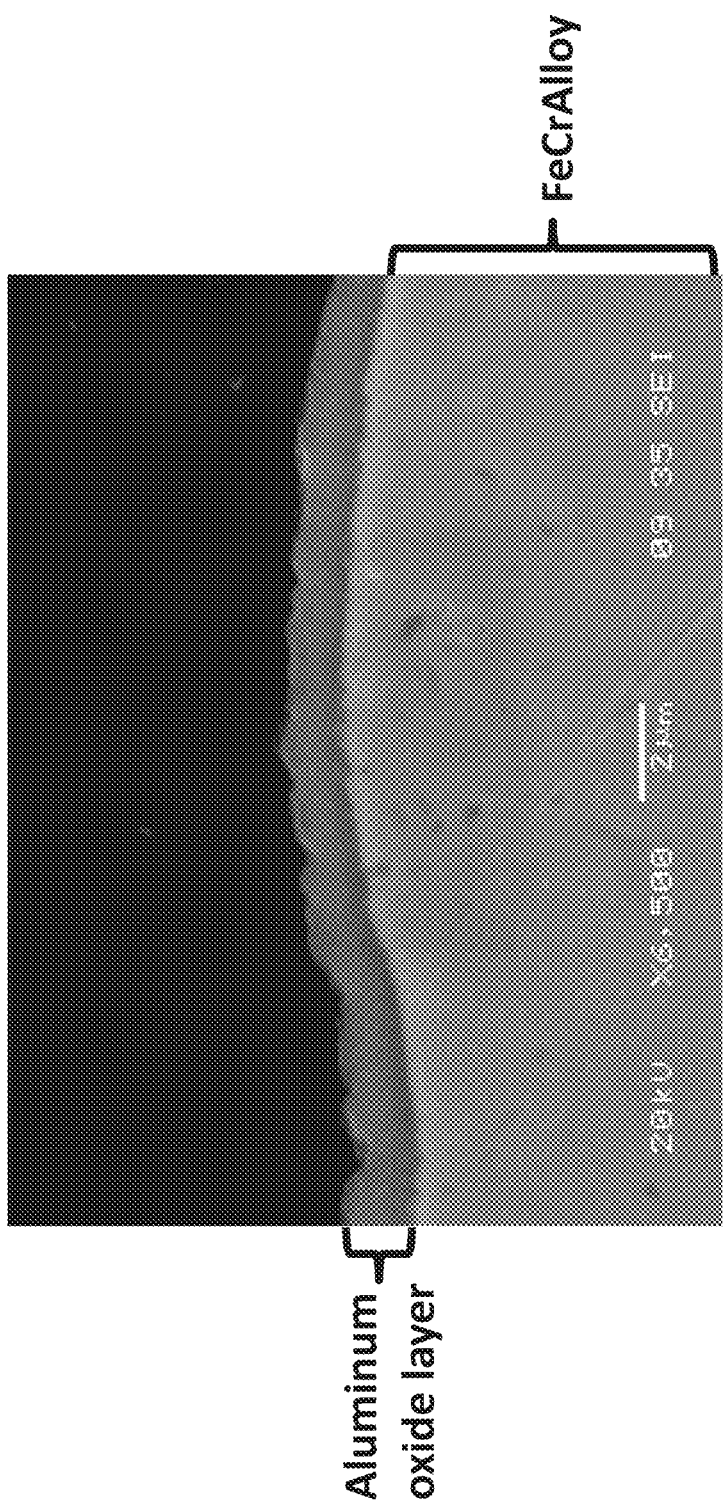
FIG. 5 is a cross-view SEM of the FeCralloy metal substrate with post-oxidation treatment of the present invention.
Figure 6:
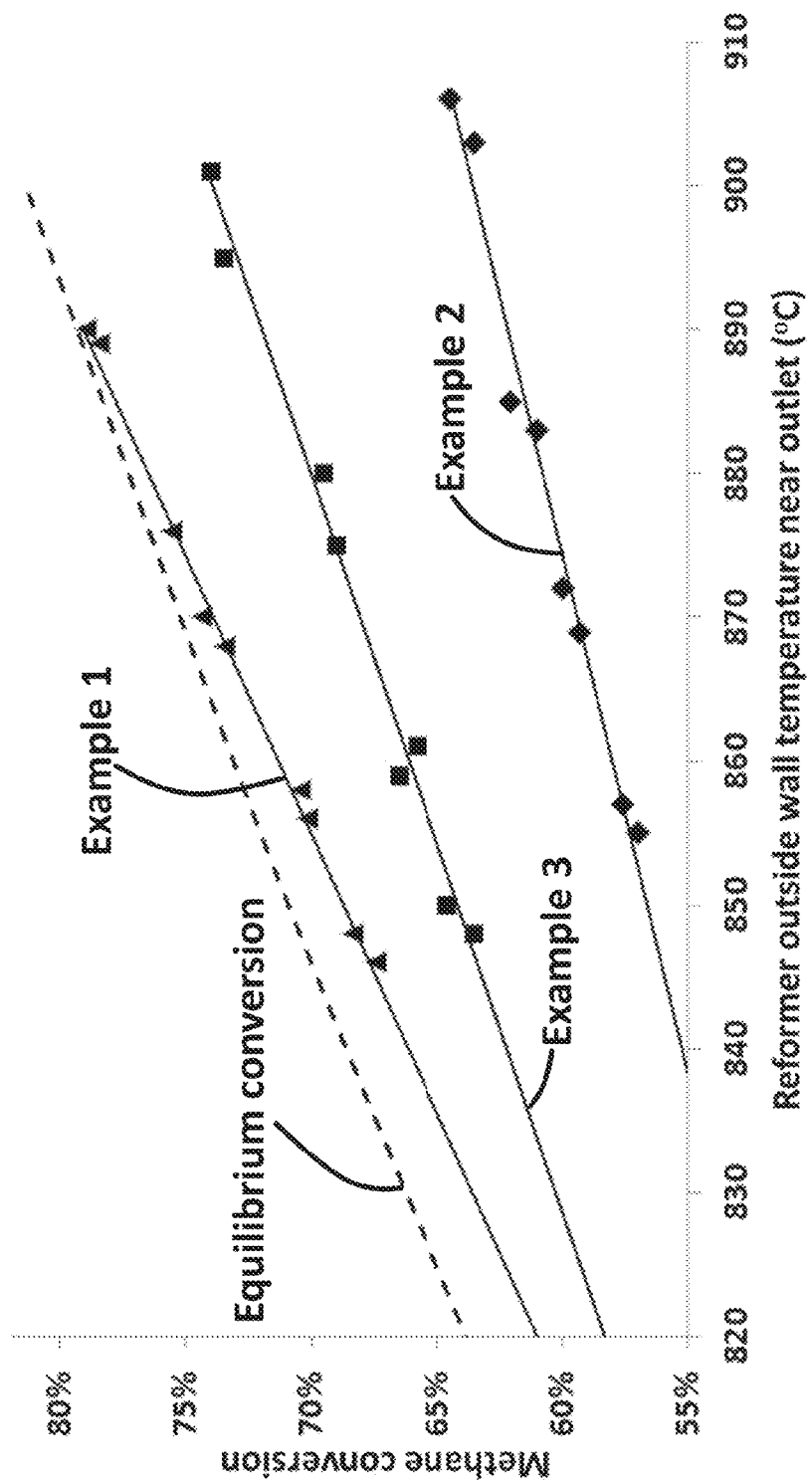
FIG. 6 is a plot of methane conversion as function of tubular reactor outside wall temperature near the reactor outlet.

A plurality of metal monoliths are spaced and loaded into an electrical-heating furnace for pretreatment prior to catalyst coating. The monolith samples are exposed to air oxidation at 950° C. for 2 hour with heating ramp rate of 2° C./min and cooling ramp rate of 2° C./min. FIG. 5 shows the SEM images of FeCrAlloy foil cross-section after air oxidation. It suggests approximately 1 µm thickness of $Al_2O_3$ layer is formed and no delamination is detected.

A catalyst slurry batch enough for coating 100 pieces of metallic monolith structures described above was prepared using 2.5 g of cerium oxide ($CeO_2$, <50 nm particle size, 30 $m^2/g$ surface area, from Sigma Aldrich) as coking resistant promoter, 2.5 g of TZ-3YS with 3 mol % yttria stabilized zirconia powder (YSZ, 0.5 µm particle size, from Tosoh Corporation) as high temperature stabilizer, 50 g of aluminum oxide ($Al_2O_3$, 80-95% gamma-phase and 5-20% alpha phase, 100 $m^2/g$ surface area, particle size of 1-2 µm, 99.98% metal basis, from Alfa Aesar) as the main catalyst ceramic support, 65 g of nickel nitrate hexahydrate (Ni$(NO_3)_2$.$6H_2O$, crystalline, from Sigma Aldrich) and 0.5 g of rhodium nitrate hydrate (Rh$(NO_3)_3$.x$H_2O$, ~36% Rh, from Sigma Aldrich) as active metal precursors to obtain 20% Ni and 0.25% Rh in the final catalyst by weight. These chemicals were mixed in a glass beaker along with 280 mL of ethanol solvent and magnetic-stirring the mixture with cover at room temperature for 1 hour. 12% by weight of plastic binder polyvinyl butyral (PVB) powder was first dissolved in ethanol solvent to enhance its homogenous mixing and then 250 mL of resulting binder solution was slowly added into the slurry mixture to increase slurry viscosity. The sol-gel slurry was further mixed at room temperature for 1.5 to 2 hours to increase its viscosity to about 650 cps. The slurry was then transferred to the ceramic beaker and loaded into the electrical-heating furnace for high temperature air combustion. The furnace was heated to 550° C. with heating ramp rate of 2.5° C./min and held for 2 hours before cooling down with cooling ramp rate of 2.5° C./min. Different from conventional catalyst combustion synthesis techniques containing combustion fuels such as urea or glycine nitrate which are highly exothermic and flammable, the combustion of viscous dried catalyst slurry occurs as relatively mild reaction and easy to be implemented since no combustion fuel involved. The final weight of catalyst powder after calcination was about 75 g. The catalyst powder was then dispersed in 300 mL isopropyl alcohol (IPA). Adding 650 g of 1.5 mm YSZ sphere milling media into the slurry container, the mixture was continuously milled for 2 hours with roller speed of 170 to 175 rpm. The average particle size of catalyst powder was about 0.8 µm. After adding 35 g of plastic Ferrobinder (B-73210, obtained from Ferro Corporation, dissolved 18.5% of PVB in toluene/ethanol with ratio of 1.7 to 1), the slurry mixture was further milled for 1 hour.

After the FeCralloy metallic monoliths were pre-oxidized, they were dip-coated with catalyst by fully immersing the monolith into the slurry. Monoliths were held in the slurry for 10 to 15 seconds before taken out and vertically suspended in order to drag out excessive slurry. The coated samples were dried at room temperature. Repeating cycles can be applied to obtain desired catalyst coating weight on metallic monoliths. In this work, total two cycles of dip-coating were applied on the substrates. After slurry coating, dry air at a flow rate of 50 scfh was blown through individual monoliths for about 10 seconds to purge any excess slurry. The coated monoliths were room temperature dried for 1 hour before loading into the electrical-heating furnace. With 2° C./min heating and cooling ramp rate, the monoliths were air sintered at 650° C. for 2 hours to burn off organic components and enhance adhesion of coating. The overall hydraulic diameter of monolith was 12.2 mm. Catalyst loading on the monoliths was determined by weighing the substrate before and after dip-coating. The average catalyst coating on metallic substrates was 0.15 g/inch and the porosity of catalyzed monolith was about 68%. Based on SEM analysis, the thickness of catalyst coating was in the range of 60 to 65 micrometer.

12 pieces of catalyzed monoliths were inserted in series into the 'U' shape reformer. Each leg of the reformer contained 6 pieces in series and there was no catalyst insert in the 'U' turn zone. So the effective length of catalytic reformer unit 10 is 1219 mm (48 inch). The 'U' shape reformer unit was loaded horizontally in the electrical heating furnace. A feed gas mixture, 18 SLPM of methane and 27 SLPM of steam (steam to carbon ratio of 1.5) was preheated prior to entering the inlet of reformer unit. Reformer pressure was controlled at 200 psig and the inlet temperature of reformer outside wall was at 650° C. By adjusting the furnace temperature setpoint, reforming performances at temperature range from 800 to 900° C. were investigated.

Example 2: Conventional Pellet Catalyst

The reforming catalyst HyProGen® R-70 is a commercially available nickel-based catalyst for steam reforming with high coking resistance. It is cylinder-shape with dimension of 3 mm OD×3 mm length. The reforming catalyst HyProGen® R-70 is randomly packed into the 'U' shape piping reformer with path length of 1295 mm (51 inch) and inside diameter of 12.7 mm (0.5 inch). The overall packing density of catalyst in the 'U' shape reformer unit is about 1.13 g/mL. Besides two parallel legs of the reformer, the 'U' turn path was also filled with pellets and the effective length containing catalyst is 1295 mm. The 'U' shape reformer unit packed with R-70 catalyst pellet was loaded vertically in an electrical heating furnace with inlet and outlet ports located on the top of reformer.

A feed gas mixture, 18 SLPM of methane and 27 SLPM of steam (steam to carbon ratio of 1.5) was preheated prior to entering the inlet of reformer unit. Reactor operating pressure was controlled at 200 psig and the inlet temperature of reformer outside wall was at 650° C. By adjusting the furnace temperature setpoint, reforming performances at temperature range from 800 to 900° C. were investigated.

Example 3: Catalyzed Corrugated Monolith

A flat square expanded Fecralloy foil with dimension of 130 mm (W)×102 mm (L) and thickness of 150 micrometer was obtained from Goodfellow Corporation. The metal foil was mechanically bent to form 18 corrugated channels along foil's width with channel height of 2.5 mm. The dimension of corrugated foil is 33 mm (W)×102 mm (L)×2.5 mm (H). The corrugated foil was rolled tightly to form a spiral monolith and the structure was secured by welding the foil edge to the spiral body. These single-strip corrugated monoliths were spaced and loaded into the electrical-heating furnace for oxidation pretreatment prior to catalyst coating. The monolith samples were exposed to air oxidation at 950° C. for 2 hour with heating ramp rate of 2° C./min and cooling ramp rate of 2° C./min.

The catalyst slurry of Ni—Rh/$Al_2O_3$ promoted with $CeO_2$ and YSZ was prepared using the same procedure described in Example 1. After the single-strip corrugated monoliths were pre-oxidized, they were dip-coated with catalyst by fully immersing the monolith into the slurry. Monoliths were held in the slurry for 10 to 15 seconds before taken out and vertically suspended in order to drag out excessive slurry. The coated samples were dried at room temperature. Repeating cycles can be applied to obtain desired catalyst coating weight on metallic monoliths. In this work, total two cycles of dip-coating were applied on the substrates. After slurry coating, dry air at a flow rate of 50 scfh was blown through individual monoliths for about 10 seconds to purge any excess slurry. The coated monoliths were room temperature dried for 1 hour before loading into the electrical-heating furnace. With 2° C./min heating and cooling ramp rate, the monoliths were air sintered at 650° C. for 2 hours to burn off organic components and enhance adhesion of coating. Catalyst loading on the monoliths was determined by weighing the substrate before and after dip-coating. The average catalyst coating on metallic substrates is 0.17 g/inch and the porosity of catalyzed monolith is about 75%. Based on SEM analysis, the thickness of catalyst coating is in the range of 85 to 90 micrometer.

12 pieces of the catalyzed corrugated monoliths were inserted in series into the 'U' shape reformer unit with path length of 1295 mm (51 inch) and inside diameter of 12.7 mm (0.5 inch). Each leg of the reformer contained 6 pieces of catalyzed corrugated monoliths s and there was no catalyst element in the 'U' turn zone. So the effective length of catalytic reformer unit is 1219 mm (48 inch). The overall hydraulic diameter of single-strip corrugated monolith is 11.6 mm. The 'U' shape reformer unit was loaded horizontally in the electrical heating furnace. A feed gas mixture, 18 SLPM of methane and 27 SLPM of steam (steam to carbon ratio of 1.5) was preheated prior to entering the inlet of reformer unit. Reformer operating pressure was controlled at 200 psig and the inlet temperature of reformer outside wall was at 650° C.

Example 4: Catalyzed Conventional Corrugated Monolith

A conventional metallic monolith substrate from Persistence Heating Applied Co., Ltd (Model number of 20126632844) prepared by winding a corrugated wave-form foil on a flat foil was obtained. This conventional monolith has an outside diameter of 25.4 mm and a length of 25.4 mm.

The monolith has channel density of 600 cpsi and the distance between channel layers is about 1 mm. There is an open channel along the monolith central axis, providing core space for rolling leaders to wind tightly between the corrugated foil and the flat foil. The inside diameter of the open channel is about 5 mm. A plurality of these corrugated monolith substrates were spaced and loaded into the electrical-heating furnace for oxidation pretreatment prior to catalyst coating. The monolith samples were exposed to air oxidation at 950° C. for 2 hour with heating ramp rate of 2° C./min and cooling ramp rate of 2° C./min. Based on SEM analysis of cross-section, the metal surface forms a 2 μm thickness of $Al_2O_3$ layer and no delamination is detected.

The catalyst slurry of Ni—Rh/$Al_2O_3$ promoted with $CeO_2$ and YSZ was prepared using the same procedure described in Example 1. After the corrugated metallic monoliths were air oxidized, they were dip-coated with catalyst by fully immersing the monolith into the slurry. Monoliths were held in the slurry for 10 to 15 seconds before taken out and vertically suspended in order to drag out excessive slurry. The coated samples were dried at room temperature. Repeating cycles can be applied to obtain desired catalyst coating weight on metallic monoliths. In this work, total two cycles of dip-coating were applied on the substrates. After slurry coating, dry air at a flow rate of 50 scfh was blown through individual monoliths for about 10 seconds to purge any excess slurry. The coated monoliths were room temperature dried for 1 hour before loading into the electrical-heating furnace. With 2° C./min heating and cooling ramp rate, the monoliths were air sintered at 650° C. for 2 hours to burn off organic components and enhance adhesion of coating. Catalyst loading on the monoliths was determined by weighing the substrate before and after dip-coating. The average catalyst coating on metallic substrates is 0.54 g/inch and the porosity of catalyzed monolith is about 71%. Based on SEM analysis, the thickness of catalyst coating is in the range of 65 to 70 micrometer.

48 pieces of these catalyzed conventional corrugated monoliths were inserted in series into the 'U' shape reformer unit with path length of 1295 mm (51 inch) and inside diameter of 28.4 mm (1.1 inch). Each leg of the reformer contained 24 pieces of catalyzed conventional corrugated monoliths and there was no catalyst element in the 'U' turn zone. So the effective length of catalytic reformer unit is 1219 mm (48 inch). The 'U' shape reformer unit was loaded horizontally in the electrical heating furnace. A feed gas mixture, 45 SLPM methane and 160 SLPM steam (steam to carbon ratio of 1.5) were applied to the reformer. The feed mixture was preheated prior to entering the inlet of reformer unit. Reformer operating pressure was controlled at 200 psig and the inlet temperature of reformer OD wall was at 650° C. By adjusting the furnace temperature set point, reforming performances at temperatures from 800 to 900° C. were investigated.

Catalyst Performance

The catalysts of Examples 1-4 were directly exposed to steam methane reforming without any pre-reducing step. After first 100 hours continuous test under targeted operating conditions (S/C of 1.5, 200 psig reactor operating pressure, product gas outlet temperature close to 850° C.), the reforming performance of each sample was tracked and analyzed. Table 1 summarizes the performance results of catalytic steam methane reforming in the reactors of all examples. Under similar operating conditions, the catalytic reformer containing pellet catalysts (Example 2) has much higher pressure drop (14.5 psi/m) than other examples. It is generally known that low space velocity in catalytic reactor enables achieving better methane conversion than high space velocity. However, because of low heat transfer coefficient and substrate surface area density of ceramic pellets, the reformer packed with catalyst pellets in Example 2 with space velocity of 20,000 to 75,000 $cm^3$/(hr g·cat) shows significantly lower methane conversion (61%) and higher approach to equilibrium temperature (38° C.) than the reformers with metallic catalyst inserts. Although the catalyst insert of present invention (Example 1) and corrugated monolith (Example 3) are both made from the single-strip of expanded metal foil, the substrate surface area density available for catalyst coating on catalyst insert of present invention is higher than corrugated monolith. The surface peak patterns on the substrate of Example 1, not only increase the roughness of metal surface but also helps retain catalyst coating, facilitate turbulent mixing and provide direct physical point contacts with tubing inside wall for better heat transfer. These benefits result in relatively high surface heat flux and volumetric heat flux and contribute to high methane conversion with less than 4° C. approach to equilibrium temperature. It is worthwhile to note that even though the ratio of $(d_m+2h_m)/D$ is above 0.95 and the catalyst inserts are in tight contact with the tube inside wall surface, very less or no catalyst coating is scrapped off from the metal substrates during catalyst loading or unloading process because of surface point contacts. High surface contact density enhances overall heat flux (both surface and volumetric) and results in 9% and 16% more than single-strip corrugated monolith (Example 3) and ceramic pellet (Example 2), respectively. This feature is beneficial for increasing the heat transfer coefficient of compact reactor and reforming tube lifetime by reducing the maximum tube wall temperature (normally measured near catalytic reformer outlet). In Example 4 the reactor (1 inch tube inside diameter) filled with conventional corrugated monoliths when operated with same feed flow as that of Example 1, the conventional corrugated monoliths achieved methane conversion of 72% and about 2° C. approach to equilibrium temperature. The catalyst insert of present invention achieved similar results, indicating the tubing material can be reduced by using small diameter tubes with same tubing length and at least 2 times of catalyst coating materials can be reduced while achieving a close targeted throughput of syngas production. To better understand the effect of space velocity, flow rate of feed mixture in Example 4 reactor was increased to 160 SLPM while maintaining steam to carbon ratio of 1.5 to achieve same GHSV as Example 1. The surface heat flux increased from 32.5 to 94.6 $kW/m^2$, however, the volumetric heat flux remained lower than that of Examples 1 and 3, leading to low methane conversion and high approach to equilibrium temperature.

FIG. 5 shows experimental results of methane conversion as a function of reformer outside wall temperature near the reformer outlet. FIG. 5 also shows equilibrium values of methane conversion as a function of temperature in the range of 820° C. to 910° C. The equilibrium values correspond to steam to carbon ratio of 1.5 and reformer operating pressure of 200 psig. As the temperature increased, the methane conversion using spiral monolith catalyst of present invention (Example 1) approached much closer to equilibrium values. The methane conversion using conventional catalyst pellets (Example 2) is relatively much further away from equilibrium values. The corrugated monolith catalyst (Example 3) formed using the FeCrAlloy material and catalyst slurry of Example 1 yielded higher methane conversion than conventional pellet catalyst but lower than that of the catalyst insert of present invention. The slopes of the best fit lines (linear regression) can be used as indicators of operational severity required to achieve desired conversion. For example, in order to increase methane conversion by 1%, the reformer outlet wall temperature need to be increased 3.8° C., 5.1° C., and 7.2° C. for catalysts of Example 1, Example 3, and Example 2, respectively.

TABLE 1

|  | Example 1 Catalyst Insert | Example 2 Conventional Pellet Catalyst | Example 3 Catalyzed corrugated monolith | Example 4 Catalyzed conventional corrugated monolith | |
|---|---|---|---|---|---|
| Substrate surface area, $m^2/m^3$ | 2620 | 914 | 2150 | 2200 | |
| Active metal | Ni—Rh | Ni | Ni—Rh | Ni—Rh | |
| Catalyst aspect ratio, $L_m/d_m$ | 8 | 1 | 9 | 1 | |
| Catalyst porosity, % | 68% | — | 75% | 71% | |
| Reactor ID (D), inch | 0.5 | 0.5 | 0.5 | 1.1 | |
| Reactor aspect ratio, L/D | 102 | 102 | 102 | 46 | |
| $(d_m + 2h_m)/D$ | 0.97 | 0.25 | 0.91 | 0.92 | |
| Reactor orientation | Horizontal | Vertical | Horizontal | Horizontal | |
| Feed mixture, SLPM | 45 | 45 | 45 | 45 | 160 |
| Reactor outside wall T, ° C. | 861 | 885 | 868 | 859 | 896 |
| Reactor product gas T at outlet, ° C. | 855 | 853 | 854 | 855 | 852 |
| Methane conversion, % | 71% | 62% | 67% | 72% | 65% |
| Pressure drop, psi | 2.6 | 18.6 | 2.5 | 0.5 | 3.3 |
| Approach to equilibrium, ° C. | 4 | 38 | 19 | 2 | 27 |
| GHSV, $cm^3$/(hr g-cat) | 375,000 | — | 331,000 | 105,300 | 375,000 |
| Heat flux, $kW/m^2$ | 55.9 | 46.8 | 51.3 | 32.5 | 94.6 |
| Volumetric heat flux, $kW/m^3$ | 17,610 | 14,740 | 16,160 | 5,120 | 14,900 |

Although the present invention has been described with reference to preferred embodiments, as will occur to those skilled in the art, changes and additions to such embodiment can be made without departing from the spirit and scope of the present invention as set forth in the appended claims. The tubular catalytic reactor and catalyst inserts of present invention, even though described in the context of syngas production is not limited to such uses.

We claim:

1. A catalyst insert for a tubular catalytic steam reforming reactor comprising a metal substrate, an interfacial catalyst layer containing an active ingredient capable of catalyzing endothermic reforming reactions;
   the metal substrate is a metal foil having a 3-D pattern of surface features comprising a plurality of peaks and grooves and said foil rolled into a spiral monolith;
   the spiral monolith having a characteristic length "$L_m$", an innermost diameter "$d_i$", an outermost diameter "$d_m$"; a characteristic spacing "$h_m$" between layers;
   wherein the ratio "$L_m/d_m$" is greater than two and the ratio "$d_i/h_m$" is less than three, wherein said 3-D pattern of surface features form about 75 peaks per square inch to about 200 peaks per square inch, and wherein said spiral monolith has a porosity of from about 50% to about 85%.

2. The catalyst insert of claim 1 wherein said active ingredient comprises at least one of Ni or Rh.

3. The catalyst insert of claim 1 wherein said interfacial catalyst layer has a thickness in the range of about 10 microns to about 80 microns.

4. The catalyst insert of claim 3 wherein said interfacial catalyst layer has a thickness in the range of about 40 microns to about 80 microns.

5. A catalytic reactor comprising a plurality of catalyst inserts according to claim 1;
   the reactor having an inlet, an outlet, an exterior surface to receive heat, an interior volume defining a fluid flow passageway of length "L" between the inlet and the outlet;
   the outlet is spaced apart from the inlet at a vertical distance "H";
   wherein the ratio "H/L" is less than 0.5; and the ratio of the lengths of plurality of catalyst inserts to the reactor length is at least 0.8.

6. The reactor of claim 5 wherein said catalyst insert is formed from a metal foil having defined surface patterns comprising a plurality of peaks and grooves, said foil rolled into a multi-layer spiral monolith, wherein said plurality of peaks and groves provide mechanical support for each rolled layer of said spiral and establish open channels through which gas can pass between the multi-layers of said spiral, wherein said rolled multi-layer spiral has a porosity of from about 50% to about 85%.

7. A process for endothermic reforming of a methane containing feed gas utilizing the catalyst inserts of claim 1, comprising:
   providing a plurality of high efficient tubular reactors arranged in a non-vertical orientation; said reactors containing said plurality of catalyst inserts; each of said reactors having an inlet, an outlet, an exterior surface to receive heat, an interior volume defining a passageway for fluid flow from the inlet to the outlet;
   providing heat and heating said reactors exterior surface to a temperature of from about 650° C. to about 950° C.;

passing a feed stream containing methane and steam at a GHSV in the range of about 200,000 cm$^3$/(hr g-cat) to about 500,000 cm$^3$/(hr g-cat);

wherein the reformed product leaving the reactor at 850° C. has an approach to equilibrium of less than 5° C.

8. The process of claim 7 wherein said tubular reactor receives heat at a volumetric heat flux of from about 15,000 kW/m$^3$ to about 25,000 kW/m$^3$.

9. The process of claim 7 where in the heat source comprises an oxygen transport membrane reactor.

* * * * *